United States Patent
Pruitt et al.

(10) Patent No.: US 10,657,163 B2
(45) Date of Patent: May 19, 2020

(54) SYSTEMS AND METHODS FOR TRACKING ASSETS ACROSS A DISTRIBUTED NETWORK ENVIRONMENT

(71) Applicant: Open Text SA ULC, Halifax (CA)

(72) Inventors: Byron Steven Pruitt, Lexington, KY (US); Jeffrey Alan Cole, Georgetown, KY (US); James Matthew Downs, Lexington, KY (US)

(73) Assignee: Open Text SA ULC, Halifax (CA)

( * ) Notice: Subject to any disclaimer, the term of this patent is extended or adjusted under 35 U.S.C. 154(b) by 268 days.

(21) Appl. No.: 15/899,551

(22) Filed: Feb. 20, 2018

(65) Prior Publication Data

US 2018/0239810 A1 Aug. 23, 2018

Related U.S. Application Data

(60) Provisional application No. 62/462,162, filed on Feb. 22, 2017.

(51) Int. Cl.
| | |
|---|---|
| *G06F 16/332* | (2019.01) |
| *G06F 16/40* | (2019.01) |
| *H04L 29/08* | (2006.01) |
| *G06Q 10/06* | (2012.01) |

(52) U.S. Cl.
CPC .......... *G06F 16/3328* (2019.01); *G06F 16/40* (2019.01); *H04L 67/125* (2013.01); *G06Q 10/06* (2013.01); *H04L 67/306* (2013.01)

(58) Field of Classification Search
CPC ....... G06F 6/3328; G06F 21/10; G06Q 10/06; H04L 67/306
See application file for complete search history.

(56) References Cited

U.S. PATENT DOCUMENTS

| | | | | |
|---|---|---|---|---|
| 8,645,365 | B2* | 2/2014 | Shiralkar | H04L 41/50 707/723 |
| 9,811,576 | B2* | 11/2017 | McGregor | G06F 21/6218 |
| 10,372,883 | B2* | 8/2019 | Hurst | G06F 16/9024 |
| 10,438,288 | B1* | 10/2019 | Hartigan | G06Q 40/06 |
| 10,452,714 | B2* | 10/2019 | Hart | G06F 16/41 |
| 2003/0074207 | A1* | 4/2003 | Pace | G06F 8/60 709/204 |
| 2003/0172020 | A1* | 9/2003 | Davies | G06Q 10/10 705/36 R |
| 2010/0306249 | A1* | 12/2010 | Hill | G06Q 30/02 707/769 |
| 2012/0221558 | A1* | 8/2012 | Byrne | G06F 17/30864 707/723 |
| 2013/0091252 | A1* | 4/2013 | Pizzorni | G06Q 10/10 709/219 |

(Continued)

OTHER PUBLICATIONS

International Search Report and Written Opinion issued for PCT Application No. PCT/IB2018/051073 dated May 14, 2018, 8 pages.

*Primary Examiner* — Leslie Wong
(74) *Attorney, Agent, or Firm* — Sprinkle IP Law Group

(57) ABSTRACT

Systems and methods for tracking and searching the usage, flow or communication of assets are disclosed. Embodiments as disclosed herein may create and update a graph representing the assets in an enterprise, where the objects and relationships in the graph represent the assets, communications, users or relationship. The graph may be queried to discover a wide variety of information regarding these assets, communications, users or relationships.

19 Claims, 6 Drawing Sheets

(56) References Cited

U.S. PATENT DOCUMENTS

| | | | |
|---|---|---|---|
| 2013/0268533 A1 | 10/2013 | Komarov | |
| 2016/0132613 A1* | 5/2016 | Obbard | G06F 16/248 |
| 2016/0350716 A1* | 12/2016 | Raghunath | G06Q 10/103 |
| 2017/0117986 A1 | 4/2017 | Perotti et al. | |
| 2017/0372043 A1* | 12/2017 | Hurst | G06F 21/10 |
| 2017/0374392 A1* | 12/2017 | Hart | G06F 16/9024 |
| 2018/0081786 A1* | 3/2018 | Berland | G06F 11/3664 |
| 2019/0340303 A1* | 11/2019 | Bessiere | G06N 5/02 |
| 2019/0340529 A1* | 11/2019 | Circlaeys | G06F 16/9536 |
| 2019/0362052 A1* | 11/2019 | Hurst | G06F 16/9024 |

\* cited by examiner

SYSTEMS AND METHODS FOR TRACKING ASSETS ACROSS A DISTRIBUTED NETWORK ENVIRONMENT

RELATED APPLICATION(S)

This application claims a benefit of priority under 35 U.S.C. § 119 from U.S. Provisional Patent Application No. 62/462,162 by inventors Pruitt et al., entitled "SYSTEMS AND METHODS FOR TRACKING ASSETS ACROSS A DISTRIBUTED NETWORK ENVIRONMENT," filed on Feb. 22, 2017, the entire contents of which are hereby fully incorporated by reference herein for all purposes.

TECHNICAL FIELD

This disclosure relates generally to the management, development, deployment and communication of content. More particularly, this disclosure relates to embodiments of systems and methods for tracking assets in a distributed network environment. Even more specifically, this disclosure relates to embodiments of systems and methods for tracking assets within a distributed, networked, enterprise environment, including the flow and usage of assets across the enterprise environment and the communication of such assets through various channels over the network.

BACKGROUND

Ever since the advent of the computer networks (including the Internet), enterprise environments have been steadily growing more complicated, encompassing an ever-expanding amount of increasingly complex digital assets (or just assets). A digital asset, in essence, is anything that exists in a binary format that may exist in the enterprise environment or otherwise be utilized by the enterprise. The digital assets of an enterprise may thus include a variety of digital content (content) including text, images, aural or video content, templates used in content delivery or other types of content. For purposes of this disclosure, the term content will be used interchangeably with the term asset and understood to have the same definition as an asset.

In an enterprise environment, these assets may be widely distributed and used for a wide variety of purposes in association with that enterprise. Previously, most enterprises kept departments siloed by function. For example, a website team was separate from their print team, which was separated from the marketing team. Content within the enterprise may have been similarly segmented; one department maintained and used the content within that department.

Now, however, all these disparate parts of an enterprise are starting to converge and overlap. In this converged environment, the various departments may share a number of assets and the departments may utilize assets from across the enterprise. Moreover, assets may build upon one another, such that an asset created by one department may include assets from one or more other departments.

To aid in managing and using their various assets, many enterprises have employed a number of content management systems, such as digital asset management (DAM) systems, content management systems (CMS), web content management (WCM) systems, enterprise content management (ECM) systems, etc. The distribution of content across an enterprise in these various management systems, along with widespread and distributed use of such content, therefore results in an extremely complex web of interconnectivity involving hundreds or sometimes thousands of systems or people.

While the types of content management systems discussed above are useful in creating, versioning and controlling access to content, they do not provide any insight into the usage and flow of the content across the enterprise. It is thus virtually impossible for it to be determined where content is used, the repository where an asset originated or resides, what content contains a particular asset or other data pertaining to the usage or movement of content within an enterprise.

It would be desirable, therefore, to have the ability to track the usage, flow and communication of assets within an enterprise along with the ability to easily search such asset data.

SUMMARY

Embodiments of systems and methods for tracking and searching asset usage, flow and communication are disclosed. Embodiments of these systems methods include a content flow server having a data store and one or more asset tracking modules deployed on one or more content management systems distributed across the enterprise. As assets are created, accessed or interacted with on these distributed content management systems, interaction notifications may be reported to the content flow server. The content flow server can store an entry in a data store corresponding to the interaction notification, where the entry may be associated with an asset. These asset entries may be associated with one another such that they represent not only the assets within an enterprise, but also the relationship between those assets (e.g., which assets are include in an asset).

In particular, in one embodiment, the data store may be a graph database such as Neo4J or may be generally a NoSQL database. Using a graph database then, embodiments of the content flow server may receive an interaction notification identifying one or more assets and store one or more objects or relationships in the graph maintained by the graph database in response to this interaction notification. In this manner, the graph maintained by the graph database can be updated to include objects representing assets of an enterprise and relationships representing the relationships between these assets (e.g., which assets include which other assets).

Moreover, when a communication (such as an email, web page or printed communication) is created or sent to a user based on the template, a communication notification identifying the template, the type of communication (e.g., channel) or the user to whom the communication was sent may be sent to the content flow server. The content flow server may store one or more objects or relationships in the graph associated with the template, communication, or user in response to this communication notification. Accordingly, the graph maintained by the graph database at the content flow server may be updated to include objects representing communications sent by an enterprise, or users who are intended recipients of such communications, and relationships representing the relationships between a communication and assets of an enterprise (e.g., the template from which the communication was created) or between a communication and an intended recipient.

Embodiments of the systems and methods disclosed herein may thus create and update a graph in a graph database representing the assets in an enterprise, where the objects and relationships in the graph represent the assets and which assets include other assets. Moreover, the graph may include objects and relationships representing communications, and which assets were used to create or generate those communications. For each communication, the graph may also include objects and relationships representing the user to whom the communication was sent and the channel through which it was sent. The graph maintained by the content flow server may thus represent a single holistic view of the assets, communications, and users across a distributed enterprise environment, including the usage, flow and communication of these assets. This type of view may provide users within the enterprise with significant insights into the assets and communications of their enterprise.

Accordingly, embodiments may provide a search interface to allow the graph to be queried. These queries may allow a user to discover a wide variety of information regarding these assets, communications and users, including, for example, where a particular asset resides (e.g., which system), what assets a particular asset has been included in, which assets are included in a particular asset, which communications include a particular asset, what communications were generated from a particular asset (e.g., template), what delivery method (e.g., channel) was used to send a communication, or other information.

Specifically, in one embodiment, a content flow system for providing asset tracking in a distributed and networked enterprise environment is provided. The content flow system may include a content flow server coupled to a set of distributed content management systems over a network, each content management system managing a corresponding set of assets and having an asset tracking module deployed thereon. The content flow server includes a graph database storing a graph, an asset tracking interface and a search interface.

In this embodiment, the graph database stores a graph representing the sets of assets across the set of distributed content management systems, including a set of asset objects and a set of first relationships between those asset objects, wherein each asset object includes a content management identifier of the content management system managing the asset corresponding to the asset object and an asset identifier used by that content management system for managing the corresponding asset.

In an embodiment, the asset tracking interface receives an interaction notification from a first asset tracking module deployed on a first content management system in the enterprise environment, the interaction notification specifying a first content management identifier of the first content management system, a first asset identifier for a first asset as used by the first content management system, and the first relationship including the first asset. The asset tracking interface can update the set of asset objects and set of first relationships of the graph in the graph database based on the interaction notification, including the first asset and the first relationship specified in the interaction notification. The set of first relationships may be, for example, usedIn relationships.

In an embodiment, the search interface of the content flow server receives a query including the first asset identifier for the first asset as used by the first content management system and the first relationship and forms a graph query corresponding to the received query, including the first asset identifier of the first asset and the first relationship. The search interface searches the graph database based on the graph query to determine a second asset object for a second asset having the first relationship to the first asset, wherein the second asset is managed by a second content manage-ment system and returns a second asset identifier for the second asset as used by the second content management system to manage the second asset and the second content management identifier of the second content management system in response to the received query.

In one embodiment, the first asset was created at the first content management system and includes the second asset managed by the second content management system.

In some embodiments, the graph represents a set of communications sent by a communication management system and wherein the graph comprises a set of communication objects and a set of second relationships between the set of asset objects and the set of communication objects. These second relationships may be, for example, generate relationships.

In particular embodiments, the graph represents a set of users to which the set of communications were sent by the communication management system and the graph comprises a set of user objects and a set of third relationships between the set of communication objects and the set of user objects. These third relationships may be, for example, sent relationships. Moreover, each sent relationship can specify a delivery method as a property.

Embodiments as disclosed herein can thus provide a number of advantages and technological improvements to the functioning of computer systems and other technology. In particular, embodiments may allow the centralized tracking, representation and searching of assets that are distributed across a network environment and the communication to users that include such assets. Heretofore, to obtain such data, would require the time consuming and inefficient access to each individual content management system and a processor intensive correlation between such assets and communication, if such data or correlation could even be obtained or correlated. Moreover, the searching and correlation of such data would be inefficient and processor intensive, requiring a large number of processor cycles and memory in order to attempt to search or correlate such data. By obtaining asset, communication and relationship data from across the distributed network environment and collecting such asset and relationship data in a centralized graph database, the power, efficiency and comprehensiveness of such searches may be increased, as the relationships between the assets, communications and users are easily discovered and traversed. In particular, a graph stored in a centralized graph database is a specific type of data structure for storing the representations of the assets that are distributed across a network environment, users of an environment and communications to users that include such assets that is designed and employed to improve the way the content flow system stores and retrieve this data in, and from memory.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
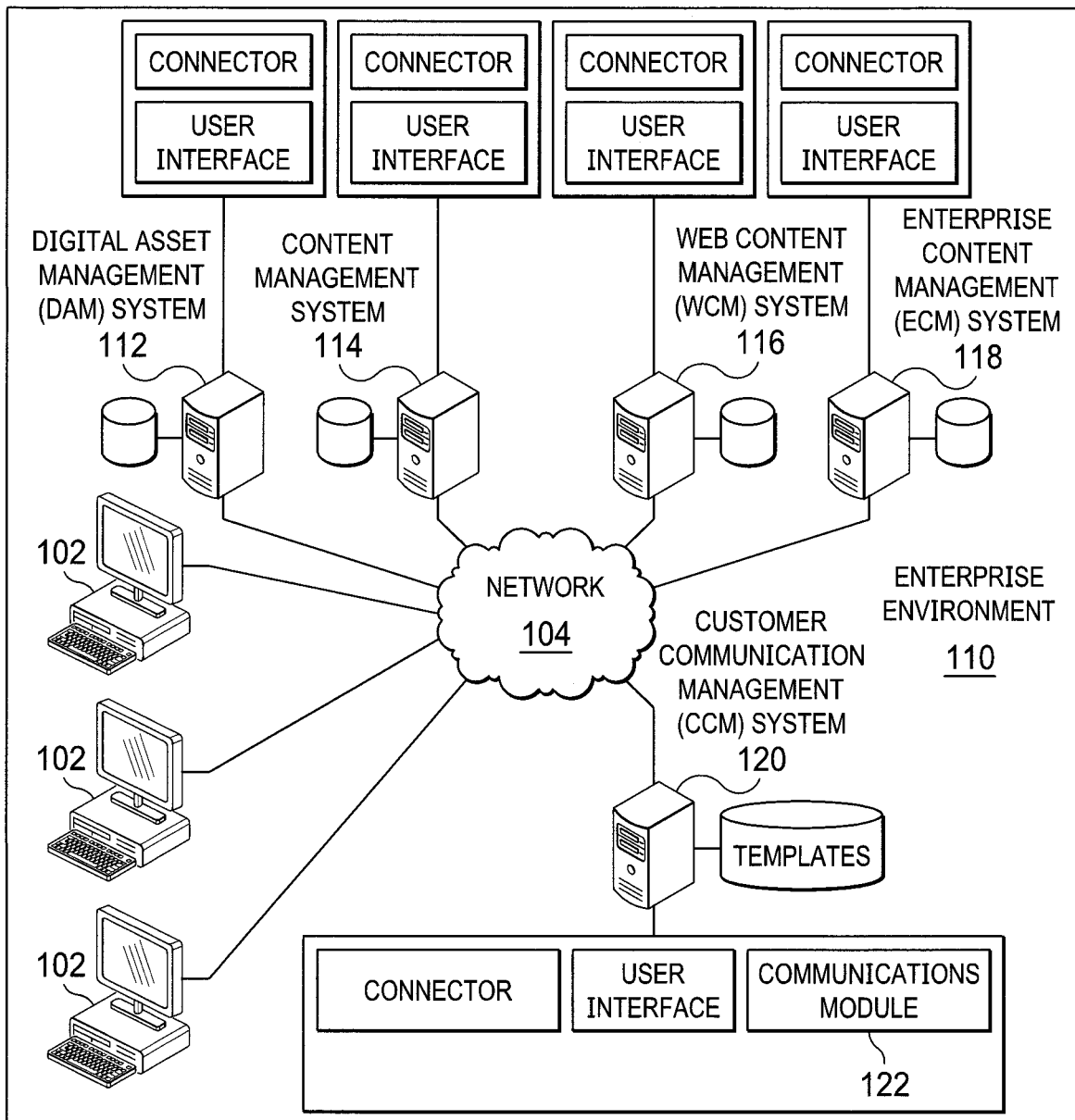
FIG. 1 is a diagrammatic representation of an architecture of a distributed enterprise environment including a communications management server.
Figure 1:
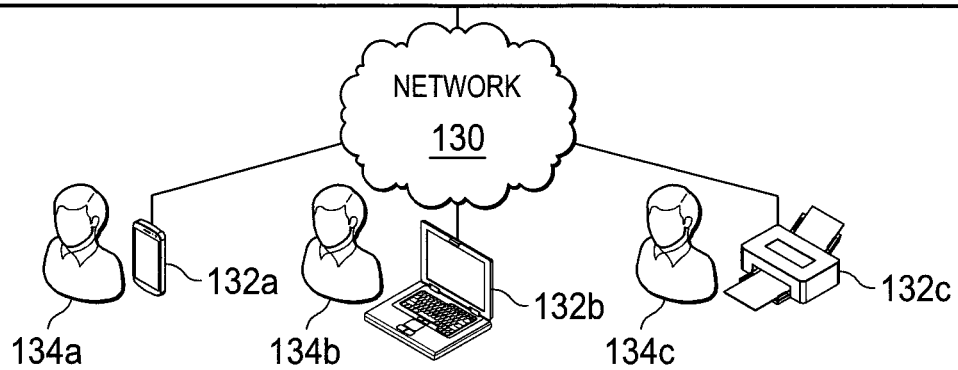

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some brief context may be helpful. As discussed above, ever since the advent of the computer networks (including the Internet), enterprise environments have been steadily growing more complicated, encompassing an ever-expanding amount of increasingly complex digital assets (or just assets). In an enterprise environment, these assets may be widely distributed and used for a wide variety of purposes in association with that enterprise. In an enterprise environment, the various departments or areas of an enterprise may share a number of assets and may utilize assets from across the enterprise. Moreover, assets may build upon one another, such that an asset created by one department may include assets from one or more other departments.

To aid in managing and using their various assets, many enterprises have employed a number of content management systems. Thus, the distribution of content across an enterprise in these various management systems along with widespread and distributed use of such content therefore results in an extremely complex web of interconnectivity involving hundreds or sometimes thousands of people or more.

While these types of content management systems discussed are useful in creating, versioning and controlling access to content, they do not provide any insight into the usage and flow of the content across the enterprise. It is thus virtually impossible for it to be determined where content is used, the repository where an asset originated or resides, what content contains a particular asset or other data pertaining to the usage or movement of content within an enterprise.

For example, suppose that an enterprise desires to employ a new logo. The enterprise thus desires to replace its old logo everywhere it is utilized within their assets. In this case, it would be useful to determine all the assets across all the systems (e.g., WCM, ECM, DAM, etc.) of the enterprise that utilize the old logo (e.g., the digital asset including the old logo). In the current enterprise ecosystem, this information is virtually impossible to determine.

A microcosm of this problem exists with respect to communication management within an enterprise. Oftentimes enterprises wish to communicate with their customers or other entities with whom they wish to engage (e.g., distributors, partners, regulatory bodies, donators, etc.). To that end, they may integrate a customer communication management (CCM) system into the enterprise. CCM solutions support these objectives, providing companies with an application to improve outbound communications with their distributors, partners, regulatory bodies, customers or others.

Such CCM systems may allow an enterprise (e.g., almost any profit or non-profit entity such as a service company, an insurance or utility company or another type of entity) to improve the creation, delivery, storage or retrieval of outbound communications, including communications used for marketing, new product introductions, renewal notifications, claims correspondence, documentation, bill statements, advertising, payment notifications, etc. These communications can occur through a number of output channels including mail (e.g., postal delivery), email, Short Message Service (SMS), web pages, mobile applications, etc. One example of a CCM is Exstream from OpenText.

To utilize such a CCM, in most cases a user at an enterprise creates a template that includes a number of assets, where each of the assets may be from one or more other distributed network locations such as a DAM, WCM or ECM within that enterprise. The CCM may use the template to generate a communication for a user associated with the enterprise (e.g., a customer) and deliver that communication in a format and through a communication channel associated with that user (e.g., as determined from a user or customer database). It is common for enterprises to have hundreds of thousands of templates for use in their CCMs, where these templates can generate millions of communications per month or more.

The assets of an enterprise may thus also be included in communications from an enterprise. In these instances, it is desirable to have the ability to track not only the usage and flow of assets in the enterprise, but additionally communications involving those assets. For example, suppose an enterprise is involved in a lawsuit where there was a digital asset that included a problematic legal clause in an asset managed by the ECM system. It may be desired to determine every customer that received this problematic legal clause through any channel (email, print, web, etc.). Again, in the current enterprise ecosystem, this information is virtually impossible to determine.

Because there has been no effective way to track where or how content is being used, or moves, within an enterprise, or is communicated, each determination regarding an enterprise's content usage, flow or communication was heretofore made in a substantially manual manner. A user within the enterprise would manually comb through the management systems of the enterprise looking for references to an asset of interest to determine the desired information. Such a process is not only expensive, but importantly is also extremely error prone.

It would be desirable, therefore, to have the ability to track the usage, flow and communication of assets within an enterprise along with the ability to easily search such asset data.

To those ends, among others, embodiments of systems and methods for tracking and searching asset usage, flow and communication are disclosed. Embodiments of these systems and methods include a content flow server having a data store and one or more asset tracking modules deployed on one or more content management systems distributed across the enterprise. As assets are created, accessed or interacted with, one or more interaction notifications may be reported to the content flow server. These interaction notifications may identify one or more assets, assets included in an asset, the content management system managing the asset, or other data associated with an asset. The content flow server can store an entry in the data store corresponding to the interaction notification, where the entry may be associated with an asset. These asset entries may be associated with one another such that they represent not only the assets within an enterprise, but also the relationship between those assets (e.g., which assets are include in an asset).

In particular, in one embodiment, the data store may be a graph database such as Neo4J or may be generally a NoSQL database. A graph database is a database that is configured to facilitate the storage and searching of objects (or nodes) and relationships (or edges) between those objects. The relationships may allow data in the graph database to be linked together directly, and in some cases retrieved with a single operation.

Using such a graph database then, embodiments of the content flow server may receive an interaction notification identifying one or more assets from an asset tracking module and store one or more objects or relationships in the graph maintained by the graph database in response to this interaction notification. In this manner, the graph maintained by the graph database can be updated to include objects representing assets of an enterprise and relationships representing the relationships between these assets (e.g., which assets include which other assets).

Embodiments of such a content flow server may be integrated into a CCM system to track the usage, flow and communication of assets of an enterprise in conjunction with the CCM system. Specifically, an asset tracking module may also be integrated into the CCM system such that the creation of templates and the usage of assets in a template may generate interaction events and corresponding notifications that are reported to the content flow server. The content flow server can receive this interaction notification and store one or more objects or relationships in the graph associated with the template, or assets included in the template, in response to this interaction notification. The graph maintained by the graph database can thus be update to include objects representing assets maintained by the CCM system (e.g., templates) of an enterprise and relationships representing the relationships between these assets (e.g., the assets included in a template).

Moreover, when a communication (such as an email, web page or printed communication) is created or sent to a user based on the template, a communication notification identifying the template, the type of communication (e.g., channel) or the user to whom the communication was sent may be sent to the content flow server. The content flow server may store one or more objects or relationships in the graph associated with the assets (e.g., template), communication, or user in response to this communication notification. Accordingly, the graph maintained by the graph database at the content flow server may be updated to include objects representing communications sent by an enterprise, or users who are intended recipients of such communications, and relationships representing the relationships between a communication and assets of an enterprise (e.g., the template from which the communication was created) or between a communication and an intended recipient.

Embodiments of the systems and methods disclosed herein may thus create and update a graph in a graph database representing the assets in an enterprise, where the objects and relationships in the graph represent the assets and which assets include other assets, including which templates include which assets. Moreover, the graph may include objects and relationships representing communications, and which assets (e.g., template) were used to create or generate those communications. For each communication, the graph may also include objects and relationships representing the user to whom the communication was sent and the channel through which it was sent. The graph maintained by the content flow server may thus represent a single holistic view of the assets, communications, and users across a distributed enterprise environment, including the usage, flow and communication of these assets. This type of view may provide users within the enterprise with significant insights into the assets and communications of their enterprise.

Accordingly, embodiments may provide a search interface to allow the graph to be queried. These queries may allow a user to discover a wide variety of information regarding these assets, communications and users, including, for example, where a particular asset resides (e.g., which system), what assets a particular asset has been included in, which assets are included in a particular asset, which communications include a particular asset, what communications were generated from a particular asset (e.g., template), what delivery method (e.g., channel) was used to send a communication, or other information.

Before discussing embodiments in more detail, it may be helpful to discuss the use of various content management systems and a CCM system in a distributed enterprise environment. It will be noted at this point that while embodiments as disclosed herein may be discussed in the context of such a CCM system, embodiments may be equally effectively utilized in association with other systems in a distributed networked enterprise environment that do not include a CCM system. Additionally, embodiments as disclosed may be integrated into an enterprise or other distributed network environment in almost any system desired or as a standalone system using embodiments of the architecture described herein.

Referring then to FIG. 1, an example of an architecture of a distributed enterprise environment is depicted. Enterprise environment 110 includes a number of content management systems, including DAM 112, content management system 114, WCM 116 and ECM 118, coupled to user devices 102 and CCM system 120 over network 104. Network 104 may be the Internet, an intranet, a wireless or wired network, a local access network (LAN), a wide access network (WAN), some combination of these types of networks, or another type or types of network.

Each of the content management systems 112, 114, 116, 118 may operate generally to allow users at user devices 102 to access, create or modify assets managed by the corresponding system 112, 114, 116, 118 using a provided user interface. These managed assets may, for example, be stored locally in a data store associated with the system 112, 114, 116, 118 or stored at a remote location. In conjunction with the creation or modification of assets, these systems 112, 114, 116, 118 may also allow the user to access or incorporate assets managed (and in some cases stored) at other content management systems in the enterprise environment 110.

Accordingly, each of the systems 112, 114, 116, 118 may include a connector configured to provide access to the managed assets on that system 112, 114, 116, 118 by another system 112, 114, 116, 118; or to obtain assets managed by another of the content management systems 112, 114, 116, 118. Thus, a user creating or modifying an asset at a content management system 112, 114, 116, 118 may utilize the user interface at that system to access and include other assets managed by another content management system 112, 114, 116, 118 in an asset being created or modified at that system 112, 114, 116, 118.

The included assets (managed by the other content management system 112, 114, 116, 118) can be accessed by the content management system 112, 114, 116, 118 with which the user is interacting using the connector at that content management system 112, 114, 116, 118 or the connector at the content management system 112, 114, 116, 118 at which the included asset resides. The created or modified asset can then be saved and managed by the content management system 112, 114, 116, 118 with which the user is interacting. In this way, a user at a user device 102 can utilize a content management system 112, 114, 116, 118 to create or modify an asset for the enterprise environment 110 where the created or modified asset may include other assets of the enterprise environment 110 residing at that, or another, content management system 112, 114, 116, 118. It will be apparent that these other assets may, in turn, also include assets managed by that, or another, content management system 112, 114, 116, 118. The created or modified asset can then be stored and managed at the content management system 112, 114, 116, 118.

As discussed above, oftentimes enterprises wish to communicate with their customers or other entities with whom they wish to engage. Thus, enterprise environment 110 may also include CCM system 120. CCM system 120 is itself a type of content management system that provides a user interface through which a user at a computing device 102 in enterprise environment 110 may create an asset including the creation of a template that includes a number of other assets, where each of the assets may be from one or more other distributed network locations such as content management systems 112, 114, 116, 118 within the enterprise environment 110.

The CCM system 120 includes a communications module 122 that uses a template to generate communications for users associated with the enterprise (e.g., a customer) and deliver that communication in a format and through a communication channel associated with that user (e.g., as determined from a user or customer database). For example, a communication may be generated from a template that includes the assets of the template and the communication delivered over network 130 (e.g., the Internet, a cellular network, the publicly switched telephone network (PSTN) or some other network or combination of networks) to user 134a at his mobile device 132a through an SMS message. Similarly, a communication may be generated from the same template that includes the assets of the template and this communication delivered over network 130 to user 134b at his computing device 132b through an email. A third communication may be generated from a template that includes the assets of the template and this third communication delivered over network 130 to user 134c as a fax on fax machine 132c.

Figure 2:
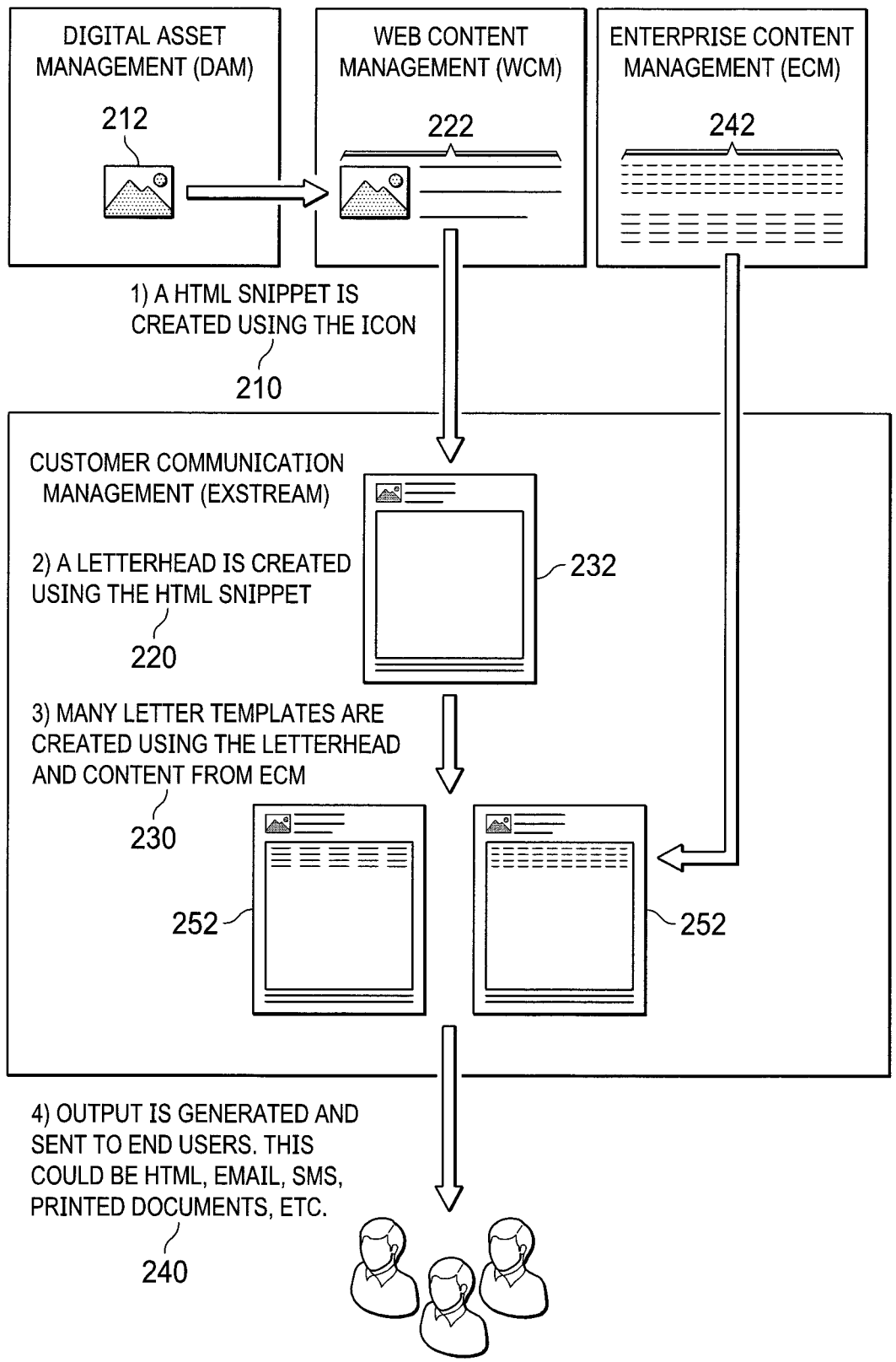
FIG. 2 is a flow diagram of the flow of assets within a distributed enterprise environment.

An example of how assets may be distributed and utilized in an enterprise environment using a CCM may be useful to an understanding of the myriad problems involved in tracking of asset flow and utilization within an enterprise environment. Moving to FIG. 2 then, a particular example of how a CCM system may be utilized in an enterprise environment is depicted. Initially, a user (e.g., on a marketing team or the like) may create an asset 212 (e.g., a logo "icon") and put this logo into a DAM system. Subsequently, a user may create another asset 222 (referred to as the "HTML snippet") at a WCM system (STEP 210). This asset 222 may include another asset 212 (e.g., the logo icon) obtained from another content management system (here the DAM system). Another asset 232 (e.g., a letterhead) can be created at the CCM using an asset (e.g., HTML snippet) obtained from the WCM (which also include the icon asset originally obtained from the DAM) (STEP 220). This letterhead asset 232 can then be used with an asset 242 (e.g., text content) obtained from the ECM in the creation of one or more additional assets 252 (e.g., letter templates) (STEP 230). The letter templates 252 may then be used to generate a number of different communications for a number of different customers that may be delivered through a number of different channels (STEP 240).

As is illustrated in this example, the assets of an enterprise may be incorporated in one another from across a number of distributed content management systems and the distributed assets may be utilized in communications from an enterprise. Accordingly, it is desirable to have the ability to track the usage and flow of assets in the enterprise, including communications involving those assets. As may be imagined, given the number of assets that may exist within a distributed network enterprise, the distribution of these asset across the distributed network environment and content management systems of the enterprise, the nature of these assets (e.g., that assets may include other assets from other locations in the enterprise) and the number of communications sent by an enterprise, accomplishing this tracking presents significant technical impediments. Nonetheless, the ability to track and search asset usage, flows and communications is highly desired by enterprises and their users.

Figure 3:
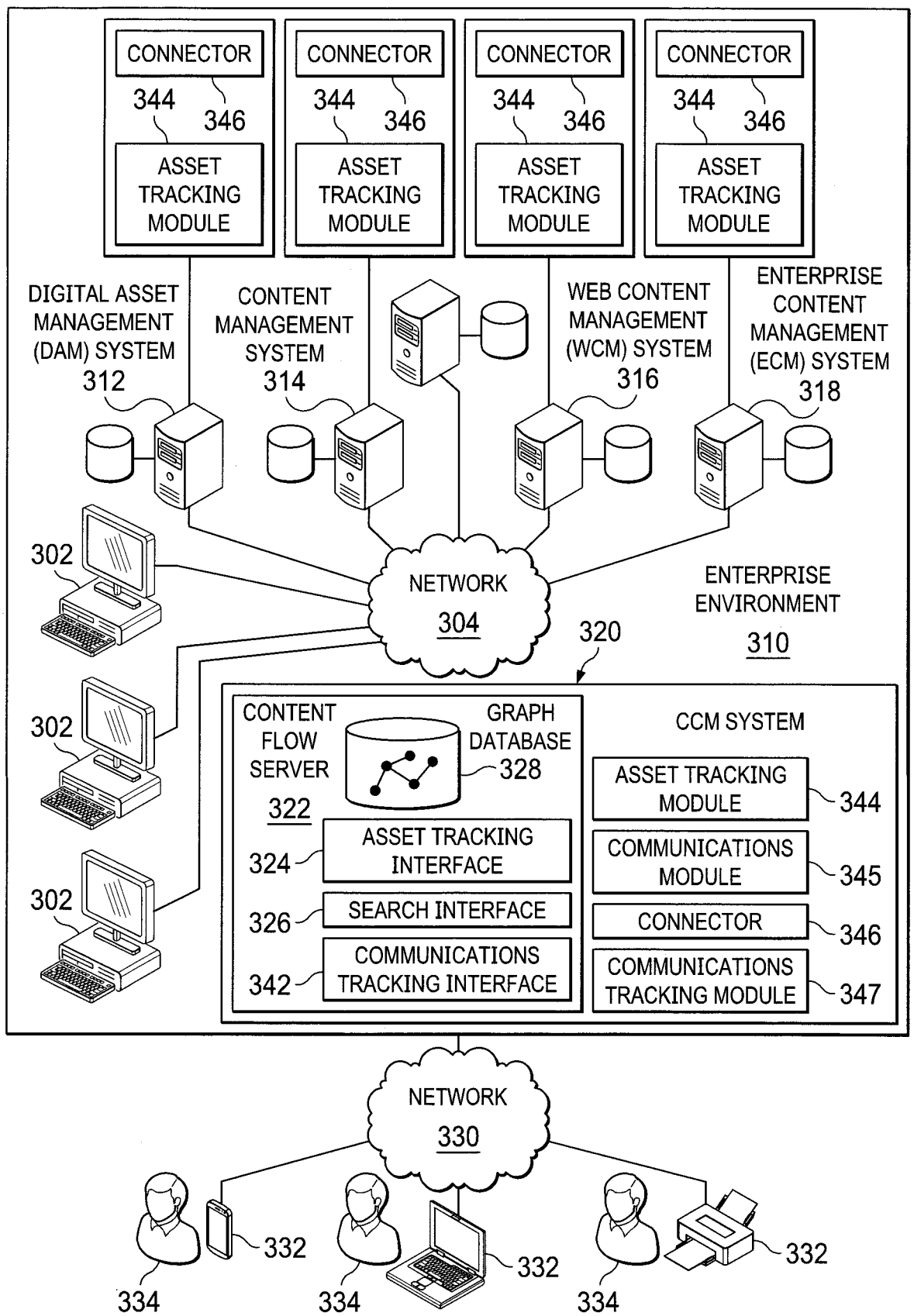
FIG. 3 is a diagrammatic representation of an architecture of a distributed enterprise environment including a content flow server.

FIG. 3 depicts an architecture of a distributed enterprise environment including an embodiment of a content flow system including a content flow server that allows just such tracking and searching of asset usage, flows and communications. In particular, as discussed above, enterprise environment 310 may include a number of content management systems, including DAM 312, content management system 314, WCM 316, ECM 318 and CCM system 320 coupled to user devices 302 and content flow server 322 over network 304. As there may be many such content management systems 312, 314, 316, 318, 320 within the enterprise environment 310, each of the content management systems 312, 314, 316, 318, 320 may be associated with a content management identifier that may serve to specifically identify the content management system.

Each of the content management systems 312, 314, 316, 318, 320 may also manage assets using a set of data or metadata (collectively management data) associated with the each managed asset, where that management data may be created, stored and updated by the content management system 312, 314, 316, 318, 320 in the course of managing the assets managed by that content management system 312, 314, 316, 318, 320. This management data may include one or more identifiers for the asset, including, for example, an asset identifier used by that content management system 312, 314, 316, 318, 320 for managing the corresponding asset.

Such an asset identifier may include, for example, an asset name, a numerical identifier for the asset, a version number identifying a version of the asset or another type of identifier by which a content management system 312, 314, 316, 318, 320 can uniquely identify a managed asset or a version thereof. Thus, in most cases, even though each content management systems may manage assets using a unique or proprietary set of data, in enterprise environment 310, an asset may be uniquely identified using a combination of the content management identifier (e.g., identifying a content management system 312, 314, 316, 318, 320 in enterprise environment 310) and an asset identifier (e.g., identifying a managed asset of that content management system).

CCM system 320, coupled to user devices 302 and content management systems 312, 314, 316, 318 over network 304, includes content flow server 322. Content flow server 322 may be incorporated with CCM system 320 and include a graph database (DB) 328 such as a Neo4J or other graph or NoSQL DB. A graph DB generally includes an interconnected set of entities (also referred to as the nodes or objects) which can hold any number of attributes (e.g., key-value-pairs). Objects can be tagged with labels representing their different roles in a domain. In addition to contextualizing objects and relationship properties, labels may also serve to attach metadata—index or constraint information—to certain objects. Relationships provide directed, named semantically relevant connections between two object-entities.

A relationship may have a direction, a type, a start node, or an end object. Like objects, relationships can have properties. In some cases, these relationships have quantitative properties, such as weights, costs, distances, ratings, time intervals, or strengths. As relationships may be stored efficiently, two objects can share any number or type of relationships without sacrificing system performance. Note that although they may be directed, relationships can be navigated regardless of direction.

Thus, graph database 328 may be configured to store objects and relationships corresponding to: assets within, and distributed across, the enterprise environment 310 and relationships between those assets; communications sent from the CCM system 320 and relationships between these communications and the assets used to create the communications; and users (e.g., customers) of the enterprise and relationships between the customers and the communications sent to those customers.

In particular, in one embodiment, the graph database 328 may store objects and relationships, including an "Asset" object type for representing assets within the enterprise environment 310, a "Communication" object type for representing communications sent from the enterprise environment 310 and a "Customer" object type for representing users to whom communications were sent. The "Asset" object type may include the properties of an asset identifier for the asset as used by the content management system that manages the asset, a version number identifying a version of the represented asset, a content management system identifier identifying the content management system in the enterprise environment that manages the represented asset, a repository identifier that may be a human readable name for the content management system managing the asset, a content type identifier identifying the file or content type of the asset (e.g., text, HTML, template, etc.), and a name property which may be a human readable identifier of the asset such as a filename.

An object of the "Communication" object type may represent a communication sent from the CCM system 320 which may be, for example, an instantiation of a template. The "Communication" object type may include properties such as a communication identifier that may be an identifier of the communication generated by the CCM system 320 when the represented communication is generated, a timestamp indicating a time at which the represented communication was generated and a data property referencing the assets included in the communication, which may be, for example, a set of pairs of content management system identifier and corresponding asset identifier.

An object of the "Customer" object type may represent a user to whom a communication was sent from the CCM system 320. The "Customer" object type may include properties such as an identifier that may be a unique identifier of the user as assigned by a system within the enterprise environment 310, and a first and last name for the user.

The relationship types maintained by the graph database 328 can include a "usedIn" relationship type that may be between two Asset objects to indicate the asset represented by one of the Asset objects is "usedIn" the asset represented by the other Asset object; a "generate" relationship type that may be used between an Asset object and a Communication object to indicate the asset represented by the Asset object has been used to "generate" the communication represented by the Communication object; and a "sent" relationship type that may be used between an Communication object and a Customer object to indicate that the communication represented by the Communication object has been "sent" to the user represented by the Customer object. A property on the "sent" relationship type may be a channel or delivery method used to deliver the communication represented by the "Communication" object.

As elaborated on above, each of the content management systems 312, 314, 316, 318, 320 may operate generally to allow users at user devices 302 to access, create or modify assets managed by the corresponding system 312, 314, 316, 318, 320 using a provided user interface. In conjunction with the creation or modification of assets, these systems 312, 314, 316, 318, 320 may also allow the user to access or incorporate assets managed (and in some cases stored) at other content management systems in the enterprise environment 310 using one or more connectors at the systems 312, 314, 316, 318, 320 to provide access to the managed assets.

Thus, a user creating or modifying an asset at a content management system 312, 314, 316, 318, 320 may utilize the user interface at the system 312, 314, 316, 318, 320 to access and include other assets managed by another content management system 312, 314, 316, 318, 320 in an asset being created or modified at that system 312, 314, 316, 318, 320. The included assets (managed by the other content management system 312, 314, 316, 318, 320) can be accessed by the content management system 312, 314, 316, 318, 320 with which the user is interacting using the connector at that content management system 312, 314, 316, 318, 320 or the connector 346 at the content management system 312, 314, 316, 318, 320 at which the included asset resides.

Embodiments of the content flow system thus include one or more asset tracking modules 344, each asset tracking module 344 deployed on a corresponding content management system 312, 314, 316, 318, 320. The asset tracking module 344 interfaces with the connector 346 at the content management system 312, 314, 316, 318, 320 such that the asset tracking module 344 is notified when assets are created or modified at the content management system 312, 314, 316, 318, 320 and, in particular, when assets are accessed or obtained from the same, or another, content management system 312, 314, 316, 318, 320 in association with the creation or modification of an asset at the content management system 312, 314, 316, 318, 320.

The asset tracking module 344 at a content management system 312, 314, 316, 318, 320 may thus be notified of assets being created or modified, the assets that the asset being created or modified includes, an asset's identifiers with respect to the content management system 312, 314, 316, 318, 320 at which they reside, identifiers for the content management system 312, 314, 316, 318, 320 at which the asset resides, a type of the content (e.g., a file type) or a human readable name associated with the asset or repository (content management system) where it originated. Other information with respect to the assets being created, modified, obtained or accessed at the content management system 312, 314, 316, 318, 320 is possible and is fully contemplated herein.

Accordingly, as assets are created, accessed or interacted with at the content management system 312, 314, 316, 318, 320, asset data obtained by the asset tracking module 344 on the content management system 312, 314, 316, 318, 320 may be sent to the content flow server 320 from the asset tracking module 344. In particular, one or more interaction notifications may be sent from the asset tracking module 344 to the content flow server 322 through asset tracking interface 324. Asset tracking interface 324 may be a REpresentational State Transfer (REST) or RESTful web service that presents a REST interface through which interaction notifications may be sent. Asset tracking module 344 may create one or more interaction notifications according to the REST interface provided by the asset tracking interface 324 of the content flow server 320 and send these interaction notifications to the asset tracking interface 324.

These interaction notifications may include the asset data obtained by the asset tracking module, including the identification of one or more assets, assets included in an asset or other data associated with an asset as enumerated above. In one embodiment, for example, the interaction notification may specify the content management identifier of the content management system 312, 314, 316, 318, 320 on which the asset is being created or edited, an asset identifier for one or more assets as used by the content management system 312, 314, 316, 318, 320 identifying the asset being created or used in the asset created, and a relationship (e.g., a "usedIn" relationship) including those assets.

When the asset tracking interface 324 receives an interaction notification from the asset tracking module 344, it may determine one or more assets from these interaction notifications, corresponding asset data for each of the assets (e.g., the identifier for the asset, the name and identifier of a content management system where the asset resides, the type of the asset, etc.) along with the relationships between those assets (e.g., which assets contain which other assets). The asset tracking interface 324 may then populate or update the graph database 328 with asset object and relationships representing the corresponding determined assets and relationships if they do not already exist in the graph maintained therein. For example, asset tracking interface 324 may update the set of asset objects and set of usedIn relationships in the graph database 328 based on the interaction notification to include creating a usedIn relationship between asset objects representing the assets identified in the interaction notification. In this manner, the graph maintained in the graph database 328 may be updated to include objects representing assets of an enterprise and relationships between these assets to track the assets, and the usage and flow of these assets, within enterprise environment 310, even where the assets are managed by different content management systems 312, 314, 316, 318, 320 distributed across enterprise environment 310.

Moreover, the content flow server 322 may track communication of these assets as generated and sent by the CCM system 320 itself. From the above description, it will be recalled that CCM system 320 provides a user interface through which a user at a computing device 302 in the enterprise may create an asset, including the creation of a template that includes a number of other assets, where each of the assets may be from the CCM system 320 or one or more other distributed network locations such as content management systems 312, 314, 316, 318 within the enterprise environment 310.

CCM system 320 includes a communications module 345 that uses an asset (e.g., a template) to generate communications for users associated with the enterprise (e.g., a customer) and deliver that communication in a format and through a communication channel associated with that user (e.g., as determined from a user or customer database). For example, a communication may be generated from a template that includes the assets of the template and the communication delivered over network 330 (e.g., the Internet, a cellular network, the PSTN or some other network or combination of networks) to users 334 at their devices 332.

Thus, in one embodiment the content flow system includes a communications tracking modules 347. The communications tracking modules 347 interfaces with the communications module 345 such that the communications tracking modules 347 is notified when communications are created or sent by the communications module 345. The communications tracking modules 347 at CCM 320 may thus be notified of a communication being created or sent and communication data including, for example, an identifier for the communication (such that the communication or template used for the communication can be located or identified at CCM system 320), data pertaining to the assets or other data included in the communication, a timestamp at which the communication was sent, the channel be which the communication was sent, data on the user (e.g., customer) to which the communication was sent (e.g., such as an identifier, or first or last name, etc.), or a wide variety of other data associated with the communication or user to whom the communication was sent. Other information with respect to the communication being created or sent is possible and is fully contemplated herein.

Accordingly, as communications are created or sent by communications module 345, communication data obtained by the communications tracking modules 347 on CCM 320 may be sent to the content flow server 322 from the communications tracking modules 347. In particular, one or more communication notifications may be sent from the communications tracking modules 347 to the content flow server 322 through communication tracking interface 342. Communication tracking interface 342 may be a REST or RESTful web service that presents a REST interface through which interaction notifications may be sent.

Communications tracking modules 347 may create one or more communication notifications according to the REST interface provided by the communication tracking interface 342 of the content flow server 322 and send these communication notifications to the communication tracking interface 342. These communication notifications may include the communication data obtained by the communications tracking modules 347 as detailed above, including the identification of a communication, template or other asset used to generate the communication, a user, delivery channel or other data associated with a communication and an indication that the communication was sent to the user.

When the communication tracking interface 342 receives a communication notification from the communications tracking modules 347, it may determine one or more assets from these communication notifications, corresponding communication data for each of the assets (e.g., the identifier for the communication, template data such as what template was used to generate the communication, user data, delivery channel data, etc.) along with the relationships between assets, the communications and user (e.g., which assets were used to generate the communication, which user the communication was sent to, what delivery channel was used to send the communication).

The communication tracking interface 342 may then populate or update the graph DB 328 with a communication object and relationships representing the corresponding determined communication and relationships if they do not already exist in the graph maintained therein. For example, in one embodiment, the communication tracking interface 342 may update the set of communication objects, set of user objects, set of generate relationships or set of sent relationships of the graph DB 328 based on the communication notification to include a communication object representing the identified communication, a user object representing the user, a generate relationship between the communication object and each asset object for assets identified in the communication notification as used to generate the communication, and a sent relationship between that communication object and a user object representing the user to whom the communication was sent. This sent relationship may be labeled with the delivery method for the communication identified in the communication notification.

In this manner, the graph maintained in the graph database 328 may be updated to include objects representing communications of an enterprise and relationships between these communications, the assets (e.g., templates and other assets) used to generate the communications, and the delivery channel (e.g., email, SMS, web page, etc.) used to send the communication in order to track the assets and the communication of the assets from the enterprise environment 310 to users.

In one embodiment, the content flow system may also include the capability to track user interaction with these communications. For example, web tracking technologies may be used to track when a user interacts with a communication such as a web page or an email. These web tracking technologies may include putting a dummy image or pixel in the communication sent to the user (e.g., in a web page or email) where the Universal Resource Locator (URL) for that image or pixel includes the URL of an interface provided by communication tracking interface 342. The URL of the dummy image or pixel may also include an identifier for the communication (e.g., the same identifier generated and stored by communications module 345 when the communication was created). In this manner, when a user interacts with the communication, a call to the URL of the dummy image or pixel may issue from the user's device to the communication tracking interface 342 with the identifier for the communication. The communication tracking interface 342 may receive this user interaction notification and create or update the graph DB 328 with an object or relationship representing the user's interaction with the identified communication.

Figure 4:
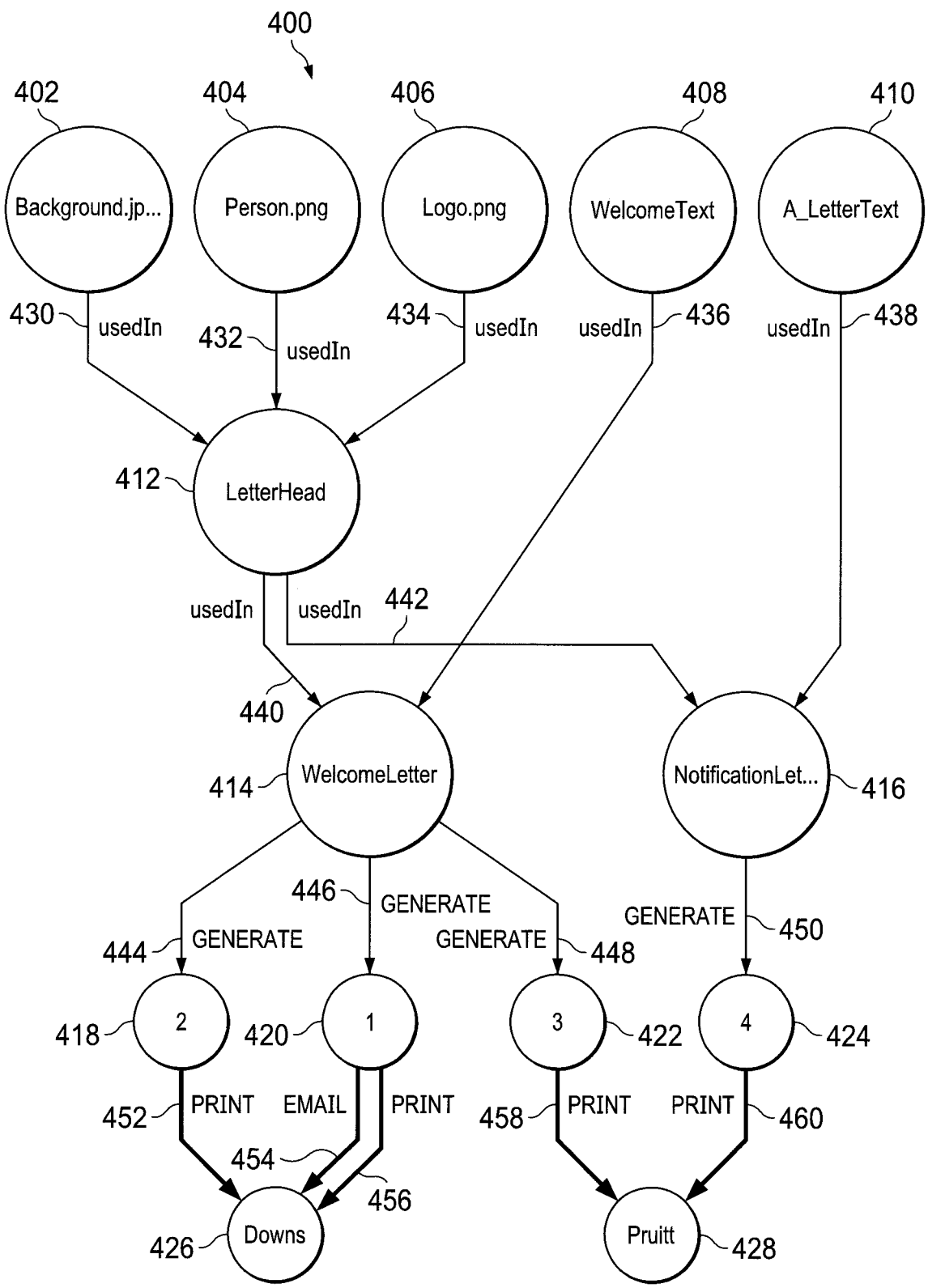
FIG. 4 is a diagrammatic representation of an example graph.

Looking now at FIG. 4, a depiction of an example graph 400 that may be maintained by the graph database of a content flow server is depicted. Here, objects 402, 404, 406 are asset objects representing assets (a background .jpg file, a person .png file and a logo .png file) that reside at a one system (e.g., a DAM system), while objects 408 and 410 are asset objects representing assets (a WelcomeText text file and an A LetterText text file) that reside at another system (e.g., an ECM system). Asset object 412 may represent an asset (e.g., a LetterHead Word file) that was created on, and resides in, a CCM system. The asset (e.g., a LetterHead Word file) represented by object 412 uses (as represented by "usedIn" relationships 430, 432, 434) the assets (Background .jpg file, person .png file and logo .png file) residing at the DAM system as represented by asset objects 402, 404, 406.

Asset object 414 may represent an asset that was created on, and resides in, the CCM system. The asset represented by asset object 414 may be a WelcomeLetter template that uses (as represented by "usedIn" relationships 440, 436) the LetterHead asset represented by asset object 412 (which, in turn, uses the assets residing at the DAM system represented by asset objects 402, 404, 406 as represented by "usedIn" relationships 430, 432, 434), and the WelcomeText text represented by asset object 408.

Similarly, asset object 416 may represent an asset that was created on, and resides in, the CCM system. The asset represented by asset object 416 may be a NotificationLetter template that uses (as represented by "usedIn" relationships 442, 438) the LetterHead asset represented by object 412 (which, in turn, uses the assets residing at the DAM system represented by assets objects 402, 404, 406 as represented by "usedIn" relationships 430, 432, 434), and the A LetterText text asset represented by asset object 410.

Each of communication objects 418, 420, 422, 424 represents a communication sent by the CCM system. Specifically, communication object 418 represents a communication generated (represented by "generate" relationship 444) from the welcomeLetter template represented by asset object 414 and sent by print (represented by "sent" relationship 452 with "print" property) to a user Downs represented by "customer" object 426. Communication object 420 represents a communication generated (represented by "generate" relationship 446) from the welcomeLetter template represented by asset object 414 and sent by print (represented by "sent" relationship 456 with "print" property) and email (represented by sent relationship 454 with "email" property) to user Downs represented by customer object 426.

Communication object 422 represents a communication generated (represented by "generate" relationship 448) from the welcomeLetter template represented by asset object 414 and sent by print (represented by "sent" relationship 458 with "print" property) to user Pruitt represented by customer object 428. Communication object 424 represents a communication generated (represented by "generate" relationship 450) from the NotificationLetter template represented by asset object 416 and sent by print (represented by "sent" relationship 460 with "print" property) to user Pruitt represented by customer object 428.

As can be seen, the systems and methods disclosed herein may thus create and update a graph in a graph database representing the assets in an enterprise, where the objects and relationships in the graph represent the assets and which assets include other assets, including which templates include which assets. Moreover, the graph may include objects and relationships representing communications, and which assets (e.g., template) were used to create those communications. For each communication, the graph may also include objects and relationships representing the user to whom the communication was sent and the channel through which it was sent.

Figure 5A:
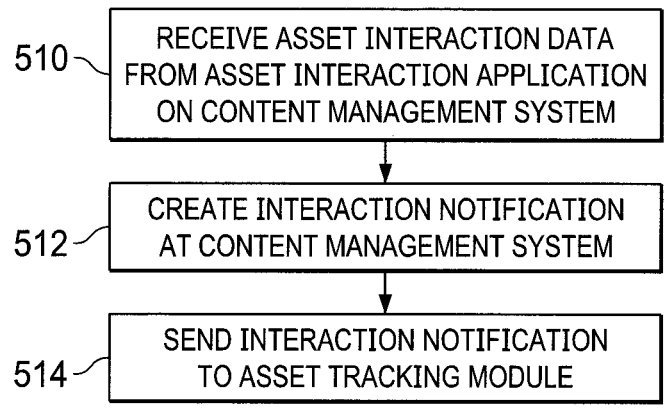
FIG. 5A is a flow diagram of one embodiment of a method for creating an asset notification.

It may be useful here to discuss embodiments of methods that may be employed by various components in a content flow system to create or update such a graph. Looking first at FIG. 5A, a flow diagram for one embodiment of a method that may be implemented by an asset tracking module in a content flow system is depicted. An asset tracking module may be installed on content management systems distributed throughout an enterprise environment. Each of the content management systems may operate generally to allow users to access, create or modify assets managed by the content management system using a provided user interface. In conjunction with the creation or modification of assets, these content management systems may also allow the user to access or incorporate assets managed at that or another content management system distributed across the enterprise environment using one or more connectors.

Thus, a user creating or modifying an asset at a content management system may utilize the user interface at the system to access and include other assets managed by the same, or another, content management system in an asset being created or modified. The included assets can be accessed by the content management system with which the user is interacting using the connector at that content management system or the connector at the content management system at which the included asset resides.

The asset tracking module may interface with the connector at the content management system. The asset tracking module can thus receive asset data from the connector on the content management system on which it is deployed when assets are accessed, created or modified (STEP 510). In this manner, the asset tracking module is notified when assets are created or modified at the content management system and, in particular, when assets are accessed or obtained from the same, or other, content management systems in association with the creation or modification of an asset at the content management system.

The asset data received by the asset tracking module may thus include a notification of assets being created or modified, which assets the asset being created or modified includes, an asset's identifiers with respect to the content management system at which they reside, identifiers for the content management system at which the asset resides, a type of the content (e.g., a file type) or a human readable name associated with the asset or repository (content management system) where it originated.

Based on the received asset data, the asset tracking module may create an interaction notification at the content management system (STEP 512). These interaction notifications may include the asset data obtained by the asset tracking module, including the identification of one or more assets, assets included in an asset or other data associated with an asset as enumerated above. In one embodiment, for example, the interaction notification may specify the content management identifier of the content management system on which the asset is being created or edited, an asset identifier for one or more assets as used by the content management system identifying the asset being created or used in the asset created, and a relationship (e.g., a "usedIn" relationship) including those assets.

Once the interaction notification is created by the asset tracking module, it can be sent to the asset tracking interface at the content flow server (STEP 514). Accordingly, as assets are created, accessed or interacted with at the content management system, asset data obtained by the asset tracking module on the content management system may be sent to the content flow server from the asset tracking module in an interaction notification through asset tracking interface. Asset tracking interface may be a REST or RESTful web service that presents a REST interface through which interaction notifications may be sent. Asset tracking module may create one or more interaction notifications according to the REST interface provided by the asset tracking interface of the content flow server and send these interaction notifications to the asset tracking interface.

Figure 5B:
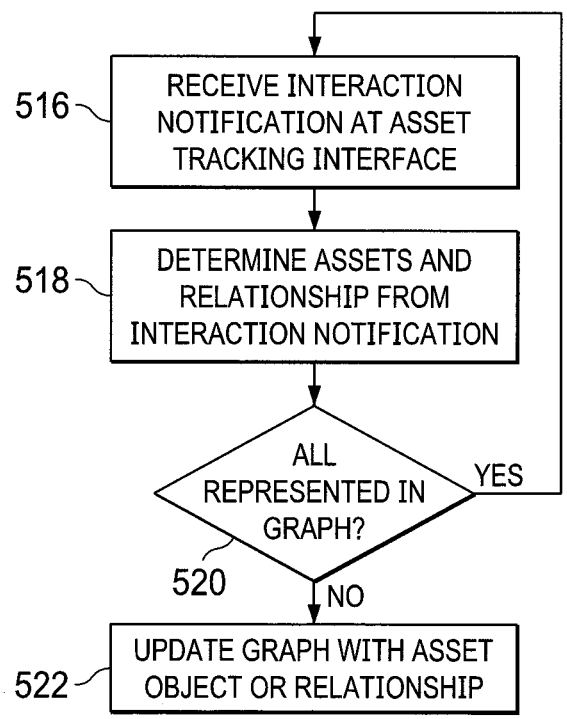
FIG. 5B is a flow diagram of one embodiment of a method for updating a graph.

Looking now at FIG. 5B, a flow diagram for one embodiment of a method that may be implemented by an asset tracking interface for updating the graph at a content flow server is depicted. The asset tracking interface receives an interaction notification from the asset tracking module (STEP 516). From the received interaction notification, the asset tracking interface may determine one or more identified assets, corresponding asset data for each of the assets (e.g., the identifier for the asset, the name and identifier of a content management system where the asset resides, the type of the asset, etc.) along with the relationships between those assets (e.g., which assets contain which other assets) (STEP 518).

The asset tracking interface can then determine if these determined assets and relationships between these assets are already represented in the graph (STEP 520). For any assets or relationships not already represented in the graph (NO branch of STEP 520), the asset tracking interface may then populate or update the graph with asset object or relationships representing those assets and relationships (STEP 522). For example, asset tracking interface may update the set of asset objects and a set of usedIn relationships in the graph database based on the interaction notification to include creating a usedIn relationship between asset objects representing the assets identified in the interaction notification. In this manner, the graph maintained in the graph database may be updated to include objects representing assets of an enterprise and relationships between these assets to track the assets, and the usage and flow of these assets, within enterprise environment, even where the assets are managed by different content management systems distributed across enterprise environment.

Figure 6A:
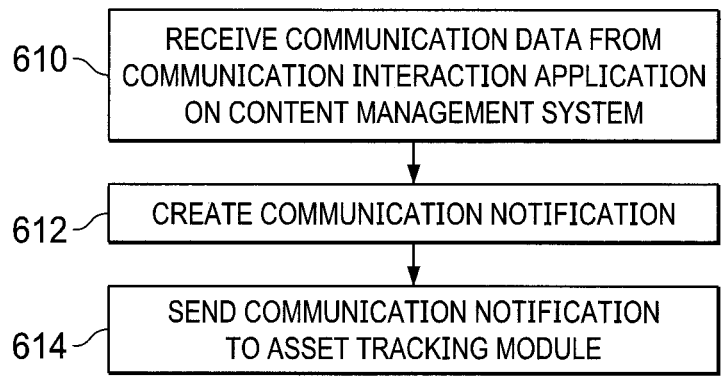
FIG. 6A is a flow diagram of one embodiment of a method for creating a communication notification.

Now referring to FIG. 6A, a flow diagram for one embodiment of a method that may be implemented by a communications tracking module in a content flow system is depicted. As discussed, a CCM system includes a communications module that uses an asset (e.g., a template) to generate communications for users associated with the enterprise (e.g., a customer) and deliver that communication in a format and through a communication channel associated with that user (e.g., as determined from a user or customer database). For example, a communication may be generated from a template that includes the assets of the template and the communication delivered over a network to users.

A communications tracking modules interfaces with the communications module to receive communication data from the communications module (STEP 610). This communication data includes a notification of a communication being created or sent and communication data including, for example, an identifier for the communication (such that the communication or template used for the communication can be located or identified), data pertaining to the assets or other data included in the communication, a timestamp at which the communication was sent, the channel by which the communication was sent, data on the user to which the communication was sent (e.g., such as an identifier, or first or last name, etc.), or a wide variety of other data associated with the communication or user to whom the communication was sent.

Based on the received communication data, the communications tracking module may create a communication notification (STEP 612). These communication notifications may include the communication data obtained by the communications tracking modules as detailed above, including the identification of a communication, template or other asset used to generate the communication, a user, delivery channel or other data associated with a communication and an indication that the communication was sent to the user. The communications tracking module may create the communication notification according to the REST interface provided by a communication tracking interface of the content flow server.

Once the communication notification is created by the communications tracking module, it can be sent to the communication tracking interface at the content flow server (STEP 614). Accordingly, as communications are created or sent by a communications module, communication data obtained by the communications tracking module may be sent to the content flow server from the communications tracking modules.

Figure 6B:
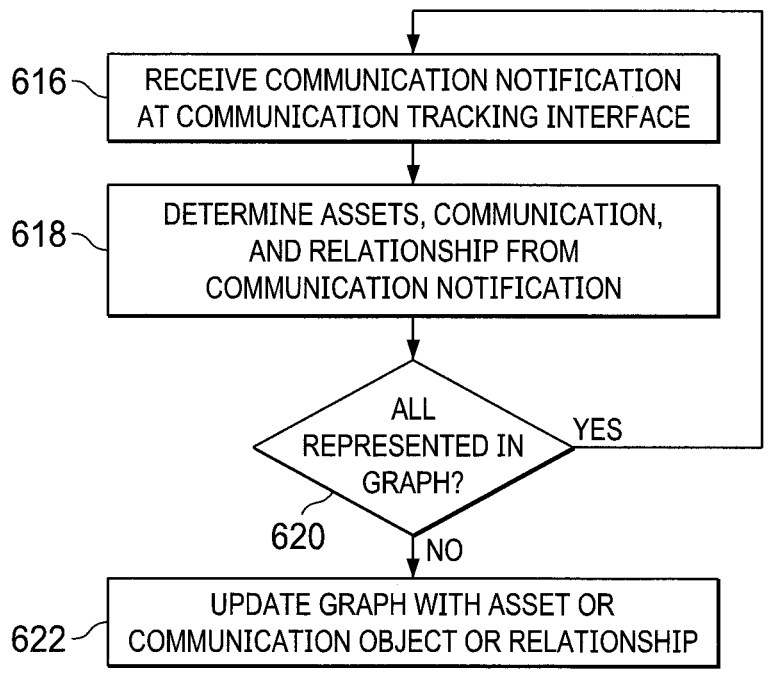
FIG. 6B is a flow diagram of one embodiment of a method for updating a graph.

In FIG. 6B, a flow diagram for one embodiment of a method that may be implemented by a communication tracking interface for updating the graph at a content flow server is depicted. The communication tracking interface receives a communication notification from the communications tracking module (STEP 616). From the received communication notification, the communication tracking interface may determine one or more communication or assets, corresponding communication data for each of the assets (e.g., the identifier for the communication, template data such as what template was used to generate the communication, user data, delivery channel data, etc.) along with the relationships between assets, the communications and user (e.g., which assets was used to generate the communication, which user the communication was sent, what delivery channel was used to send the communication)(STEP 618).

The communication tracking interface can then determine if these determined assets, communication and relationships between these assets and communications are already represented in the graph (STEP 620). For any assets, communications or relationships not already represented in the graph (NO branch of STEP 620), the communication tracking interface may then populate or update the graph with asset or communication objects, or relationships, representing those assets, communications and relationships (STEP 622). For example, in one embodiment, the communication tracking interface may update the set of communication objects, set of user objects, set of generate relationships or set of sent relationships of the graph based on the communication notification to include a communication object representing the identified communication, a user object representing the user, a generate relationship between the communication object and each asset object for assets identified in the communication notification as used to generate the communication, and a sent relationship between that communication object and a user object representing the user to whom the communication was sent. This sent relationship may be labeled with the delivery method for the communication identified in the communication notification.

In this manner, the graph at a content flow server may be updated to include objects representing communications of an enterprise and relationships between these communications, the assets (e.g., templates and other assets) used to generate the communications, and the delivery channel (e.g., email, SMS, web page, etc.) used to send the communication in order to track the assets and the communication of the assets from the enterprise environment to users.

As discussed then, a graph at a content flow server may be created and updated to represent the assets, communications, users and relationships in a distributed network enterprise. Returning to FIG. 3 then, the graph maintained by the graph DB 328 of the content flow server 322 may thus represent a single holistic view of the assets, communications, and users across distributed enterprise environment 310, including the usage, flow and communication of these assets. This type of view may provide users within the enterprise with significant insights into the assets and communications of their enterprise.

Accordingly, content flow server 322 may also include search interface 326 to allow the graph to be queried. The search interface 326 may include one or more browser based interfaces, APIs, RESTful interfaces or other type of interface that allows a user (e.g., at a user computing device 302 within the enterprise environment 310) to submit a search query.

In one embodiment, the search interface 326 may provide a widget or other interface that may be incorporated into another interface. By incorporating the search interface 326 or the ability to access the search interface 326 into other interfaces, users of the content management systems 312, 314, 316, 318, 320 may be provided with the ability to discover where and how the assets of the enterprise environment 310 are utilized, even when utilizing the native interface of a particular content management system 312, 314, 316, 318, 320.

The queries submitted by a user through the search interface 326 may allow a user to discover a wide variety of information regarding the assets, communications and users represented by the graph in the graph database 328 including, for example, where a particular asset resides (e.g., which system), what assets a particular asset has been included in, which assets are included in a particular asset, which communications include a particular asset, what communications were generated from a particular asset (e.g., template), what users a certain asset was sent to, or other information.

The search interface 326 may receive the search criteria or terms for a query through the interface, formulate the query according to a graph query language such as Cypher, SPARQL, GraphQL, etc. and submit the query to the graph database 328. The returned results may be returned through the search interface 326 in response to the query.

In one embodiment, the search interface 326 may receive a query including an asset identifier for an asset and an identification of one or more (or all of) a "generate", a "usedIn" or a "sent" relationship. The search interface can form a graph query corresponding to the received query that includes the asset identifier and the identified relationships. The graph database 328 is then searched based on the formed graph query to determine asset objects, communication objects or user objects having the identified relationships to the identified asset. Users, communications or assets located from the search of the graph in graph database 328 may then be returned in response to the received query and presented through the search interface 326.

For example, an enterprise may utilize a particular logo that needs to be updated. To determine all the templates or other assets that use this logo asset, a user may desire to locate page templates that utilize this logo. Assume for purposes of this example that the logo which needs to be updated has an asset identifier of "1". Thus, a user may form a query to show all page templates that use this logo either directly or indirectly through compound assets: MATCH (asset:Assets {id: "1"})-[:usedIn*..]→(templates:Assets {contentType:"exstream/pagetemplate"}) RETURN templates. In such a query, the "(asset:Assets {id: "1"})" term will cause a search to find any asset object representing an asset with id=1. The "-[:usedIn*..]→" term of the query will allow the search to follow all paths in the graph containing "usedIn" relationships originating with any of those identified asset objects (e.g., which may include multiple of these relationships between various asset objects in a path) during the search. The "(templates:Assets{contentType:"exstream/pagetemplate"})" term will allow the query to locate any assets object in the traversed paths with a content type of "Exstream/pagetemplate" in the property of the asset. Identifiers of the assets represented by these located asset objects can then be returned through the search interface 326.

As another example, suppose there is an upcoming lawsuit and there was legal text sent to certain customers by the enterprise that may be problematic. It may thus be important for a user within the enterprise to determine every customer that received this legal text. Assume for purposes of this example that the asset with the legal text has an asset identifier of "2." Here, a user may form a query to show all customers that received a communication that included that asset: MATCH (asset:Assets {id: "2"})-[*..]→(c:User) RETURN c. In such a query, the "(asset:Assets {id: "2"})" term will locate any asset objects in the graph that have id=2. The "-[*..]→" term will follow any paths that originate at that asset object by traversing the path of objects and relationships that originate with any of those identified asset objects as many hops as needed. The "(c:User)" term will return an identification of the user associated with any user objects in any of the traversed paths. Identifiers of these users can then be returned through the search interface 326.

Those skilled in the relevant art will appreciate that the invention can be implemented or practiced with other computer system configurations including, without limitation, multi-processor systems, network devices, mini-computers, mainframe computers, data processors, and the like. The invention can be embodied in a general purpose computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

What is claimed is:

1. A content flow system for providing asset tracking in a distributed and networked enterprise environment, comprising:

a content flow server coupled to a set of distributed content management systems over a network, each content management system managing a corresponding set of assets and having an asset tracking module deployed thereon, the content flow server including:

a graph database storing a graph representing the sets of assets across the set of distributed content management systems, a set of communications sent by a communication management system and a set of users to which the set of communications were sent by the communication management system, the graph comprising:

a set of asset objects and a set of usedIn relationships between those asset objects, wherein each asset object includes a content management identifier of the content management system managing the asset corresponding to the asset object and an asset identifier used by that content management system for managing the corresponding asset, a set of communication objects and a set of generate relationships between the set of asset objects and the set of communication objects, and a set of user objects and a set of sent relationships between the set of communication objects and the set of user objects, each sent relationship specifying a delivery method as a property;

an asset tracking interface for:

receiving an interaction notification from a first asset tracking module deployed on a first content management system in the enterprise environment, the interaction notification specifying a first content management identifier of the first content management system, a first asset identifier for a first asset as used by the first content management system, and the first usedIn relationship including the first asset; and updating the set of asset objects and set of usedIn relationships of the graph in the graph database based on the interaction notification, including creating a usedIn relationship between a first asset object representing the first asset and at least one second asset object representing a second asset managed by a second content management system;

a communication tracking interface for:

receiving a communication notification from a communications tracking module deployed on the communication management system in the enterprise environment, the communication notification specifying a first communication, a generate relationship with the first asset and a sent relationship including the first communication and a first user; and updating the set of communication objects, set of user objects, set of generate relationships and set of sent relationships of the graph of the graph database to include a first communication object representing the first communication, a first user object representing the first user, a first generate relationship between the first communication object and the first asset object and a first sent relationship between the first communication object and the first user object; and a search interface for:
  receiving a query including the first asset identifier for the first asset as used by the first content management system and the generate relationship;
  forming a graph query corresponding to the received query, including the first asset identifier of the first asset;
  searching the graph database based on the graph query to determine the first user object for the first user having the first sent relationship to the first communication object having the generate relationship to the first asset object; and
  returning, in response to the received query, a user identifier for the first user associated with the first user object and the delivery method associated with the first sent relationship between the first user object and the first communication object.

2. A content flow system for providing asset tracking in a distributed and networked enterprise environment, comprising:
  a content flow server coupled to a set of distributed content management systems over a network, each content management system managing a corresponding set of assets and having an asset tracking module deployed thereon, the content flow server including:
  a graph database storing a graph representing the sets of assets across the set of distributed content management systems, the graph comprising a set of asset objects and a set of first relationships between those asset objects, wherein each asset object includes a content management identifier of the content management system managing the asset corresponding to the asset object and an asset identifier used by that content management system for managing the corresponding asset;
  an asset tracking interface for:
    receiving an interaction notification from a first asset tracking module deployed on a first content management system in the enterprise environment, the interaction notification specifying a first content management identifier of the first content management system, a first asset identifier for a first asset as used by the first content management system, and the first relationship including the first asset; and
    updating the set of asset objects and set of first relationships of the graph in the graph database based on the interaction notification, including the first asset and the first relationship specified in the interaction notification; and
  a search interface for:
    receiving a query including the first asset identifier for the first asset as used by the first content management system and the first relationship;
    forming a graph query corresponding to the received query, including the first asset identifier of the first asset and the first relationship;
    searching the graph database based on the graph query to determine a second asset object for a second asset having the first relationship to the first asset, wherein the second asset is managed by a second content management system; and
    returning, in response to the received query, a second asset identifier for the second asset as used by the second content management system to manage the second asset and the second content management identifier of the second content management system.

3. The system of claim 2, wherein the first asset was created at the first content management system and includes the second asset managed by the second content management system.

4. The system of claim 3, wherein the set of first relationships are usedIn relationships.

5. The system of claim 2, wherein the graph represents a set of communications sent by a communication management system and wherein the graph comprises a set of communication objects and a set of second relationships between the set of asset objects and the set of communication objects.

6. The system of claim 5, wherein the second relationships are generate relationships.

7. The system of claim 2, wherein the graph represents a set of users to which the set of communications were sent by the communication management system and the graph comprises a set of user objects and a set of third relationships between the set of communication objects and the set of user objects.

8. The system of claim 5, wherein the third relationships are sent relationships.

9. The system of claim 8, wherein each sent relationship specifies a delivery method as a property.

10. The system of claim 5, wherein the content flow server includes a communication tracking interface for:
  receiving a communication notification from a communications tracking module deployed on the communication management system in the enterprise environment, the communication notification specifying a first communication, a second relationship and a third relationship including the first communication and a first user; and
  updating the set of communication objects, set of user objects, set of second relationships and a set of third relationships of the graph of the graph database based on the first communication, the first user and the second relationship specified in the interaction notification.

11. A non-transitory computer readable medium, comprising instructions for providing asset tracking in a distributed and networked enterprise environment including a content flow server coupled to a set of distributed content management systems over a network, each content management system managing a corresponding set of assets and having an asset tracking module deployed thereon, the instruction executable on the content flow server to:
  access a graph database storing a graph representing the sets of assets across the set of distributed content management systems, the graph comprising a set of asset objects and a set of first relationships between those asset objects, wherein each asset object includes a content management identifier of the content management system managing the asset corresponding to the asset object and an asset identifier used by that content management system for managing the corresponding asset;
  provide an asset tracking interface for:
    receiving an interaction notification from a first asset tracking module deployed on a first content management system in the enterprise environment, the interaction notification specifying a first content management identifier of the first content management system, a first asset identifier for a first asset as used by the first content management system, and the first relationship including the first asset; and updating the set of asset objects and set of first relationships of the graph in the graph database based on the interaction notification, including the first asset and the first relationship specified in the interaction notification; and provide a search interface for:
- receiving a query including the first asset identifier for the first asset as used by the first content management system and the first relationship;
- forming a graph query corresponding to the received query, including the first asset identifier of the first asset and the first relationship;
- searching the graph database based on the graph query to determine a second asset object for a second asset having the first relationship to the first asset, wherein the second asset is managed by a second content management system; and
- returning, in response to the received query, a second asset identifier for the second asset as used by the second content management system to manage the second asset and the second content management identifier of the second content management system.

12. The computer readable medium of claim 11, wherein the first asset was created at the first content management system and includes the second asset managed by the second content management system.

13. The computer readable medium of claim 12, wherein the set of first relationships are usedIn relationships.

14. The computer readable medium of claim 11, wherein the graph represents a set of communications sent by a communication management system and wherein the graph comprises a set of communication objects and a set of second relationships between the set of asset objects and the set of communication objects.

15. The computer readable medium of claim 14, wherein the second relationships are generate relationships.

16. The computer readable medium of claim 11, wherein the graph represents a set of users to which the set of communications were sent by the communication management system and the graph comprises a set of user objects and a set of third relationships between the set of communication objects and the set of user objects.

17. The computer readable medium of claim 14, wherein the third relationships are sent relationships.

18. The computer readable medium of claim 17, wherein each sent relationship specifies a delivery method as a property.

19. The computer readable medium of claim 14, wherein the content flow server includes a communication tracking interface for:
- receiving a communication notification from a communications tracking module deployed on the communication management system in the enterprise environment, the communication notification specifying a first communication, a second relationship and a third relationship including the first communication and a first user; and
- updating the set of communication objects, set of user objects, set of second relationships and a set of third relationships of the graph of the graph database based on the first communication, the first user and the second relationship specified in the interaction notification.

* * * * *